United States Patent
Pelletier et al.

(10) Patent No.: US 12,168,273 B2
(45) Date of Patent: Dec. 17, 2024

(54) METHOD FOR PRODUCING HEAT EXCHANGER

(71) Applicant: Danfoss A/S, Nordborg (DK)

(72) Inventors: Pierre Olivier Pelletier, Jiaxing Zhejiang (CN); Leilei Wang, Jiaxing Zhejiang (CN)

(73) Assignee: DANFOSS A/S, Nordborg (DK)

(*) Notice: Subject to any disclaimer, the term of this patent is extended or adjusted under 35 U.S.C. 154(b) by 265 days.

(21) Appl. No.: 17/632,806

(22) PCT Filed: Jul. 30, 2020

(86) PCT No.: PCT/CN2020/105824
§ 371 (c)(1),
(2) Date: Feb. 4, 2022

(87) PCT Pub. No.: WO2021/023092
PCT Pub. Date: Feb. 11, 2021

(65) Prior Publication Data
US 2022/0274216 A1    Sep. 1, 2022

(30) Foreign Application Priority Data
Aug. 7, 2019  (CN) .......................... 201910728082.4

(51) Int. Cl.
*B23P 15/26*    (2006.01)
*F28F 1/02*    (2006.01)
(Continued)

(52) U.S. Cl.
CPC .............. *B23P 15/26* (2013.01); *F28F 1/022* (2013.01); *F28F 1/325* (2013.01); *F28D 1/05366* (2013.01)

(58) Field of Classification Search
CPC ........... B23P 15/26; B23P 11/00; B23P 21/00; F28F 1/022; F28F 1/325; F28F 2275/06;
(Continued)

(56) References Cited

U.S. PATENT DOCUMENTS 5,890,288 A * 4/1999 Rhodes ................. F28D 1/0391
29/890.053
2005/0061494 A1   3/2005 Tsuji et al.
(Continued)

FOREIGN PATENT DOCUMENTS

CN    101844184 A    9/2010
CN    102192672 A    9/2011
(Continued)

OTHER PUBLICATIONS

International Search Report for PCT/CN2020/105824 Dated Oct. 23, 2020.
Extended European Search Report corresponding to European Patent Application Serial No. 20849744.6 dated Jul. 28, 2023.
(Continued)

*Primary Examiner* — Lee A Holly
(74) *Attorney, Agent, or Firm* — McCormick, Paulding & Huber PLLC (57) ABSTRACT

Disclosed is a method for producing a heat exchanger. The heat exchanger includes heat exchange tubes extending along a first direction and arranged along a second direction perpendicular to the first direction, and a fin. The fin is provided with fin grooves for mounting the heat exchange tubes, and each fin groove is provided with an opening on one side in a third direction perpendicular to the first direction and the second direction. The method includes: providing a heat exchange tube preform, the heat exchange tube preform having a maximum size in a second direction; providing a fin preform, a fin groove of the fin preform having a minimum size in the second direction, and the
(Continued)

maximum size being greater than the minimum size; inserting the heat exchange tube preform into the fin groove of the fin preform, so as to generate a predetermined contact pressure between the heat exchange tube preform and the fin preform by means of the elastic deformation of at least one of the heat exchange tube preform and the fin preform; and welding the heat exchange tube preform and the fin preform together.

18 Claims, 11 Drawing Sheets

(51) Int. Cl.
*F28F 1/32* (2006.01)
*F28D 1/053* (2006.01)

(58) Field of Classification Search
CPC ........ F28F 9/02; F28F 1/30; F28F 1/02; F28F 1/32; F28D 1/05366; F28D 1/0391; F28D 1/053; B21D 53/085
See application file for complete search history.

(56) References Cited

U.S. PATENT DOCUMENTS

2012/0103583 A1* 5/2012 Kim .................... F28D 1/05391
165/181
2014/0262173 A1* 9/2014 Nagurny .................... F28D 7/16
29/890.038
2016/0356562 A1* 12/2016 Terada .................... C22C 21/02
2018/0320989 A1 11/2018 Baba

FOREIGN PATENT DOCUMENTS

| | | |
|---|---|---|
| CN | 106062500 A | 10/2016 |
| CN | 106482538 A | 3/2017 |
| CN | 108398045 A | 8/2018 |
| EP | 1 215 461 A2 | 6/2002 |
| JP | 2002-130969 A | 5/2002 |
| JP | 2003-148889 A | 5/2003 |
| JP | 2008170041 A | 7/2008 |
| JP | 2010008018 A | 1/2010 |
| JP | 2012-247091 A | 12/2012 |
| JP | 2018-054269 A | 4/2018 |
| KR | 20150119982 A | 10/2015 |
| KR | 2015-0133667 A | 11/2015 |
| WO | 2017-145701 A1 | 7/2018 |

OTHER PUBLICATIONS

Notice of the Reason for Refusal for Japanese Patent Application No. 2022-506764, dated Feb. 27, 2024, and its English translation.
Notice of Grounds for Rejection and its English translation for corresponding Korean Patent Application No. 10-2022-7006250 dated Aug. 9, 2024.

* cited by examiner

METHOD FOR PRODUCING HEAT EXCHANGER

CROSS-REFERENCE TO RELATED APPLICATION

This application is a National Stage application of International Patent Application No. PCT/CN2020/105824, filed on Jul. 30, 2020, which claims priority to Chinese Application No. 201910728082.4 filed on Aug. 7, 2019, each of which is hereby incorporated by reference in its entirety.

TECHNICAL FIELD

Embodiments of the present invention relate to a method for producing a heat exchanger.

BACKGROUND

Heat exchangers such as micro channel heat exchangers comprise fins and heat exchange tubes, such as flat tubes, and the heat exchange tubes and the fins are welded together.

SUMMARY

An object of an embodiment of the present invention is to provide a method for producing a heat exchanger, so as to, for example, improve welding quality of heat exchange tubes and a fin of the heat exchanger.

An embodiment of the present invention provides a method for producing a heat exchanger, the heat exchanger comprising: a plurality of heat exchange tubes, the plurality of heat exchange tubes extending in a first direction and being arranged in a second direction perpendicular to the first direction; and a fin, the fin being provided with a plurality of fin grooves for mounting the plurality of heat exchange tubes respectively, and the fin groove being provided with an opening on one side in a third direction perpendicular to the first direction and the second direction, the method comprising the steps of: providing heat exchange tube preforms for forming heat exchange tubes, the heat exchange tube preform having a maximum size in the second direction; providing a fin preform for forming a fin, the fin groove of the fin preform having a minimum size in the second direction, and the maximum size being greater than the minimum size; inserting the heat exchange tube preforms into the fin grooves of the fin preform, so as to generate a predetermined contact pressure between the heat exchange tube preform and the fin preform by means of an elastic deformation of at least one of the heat exchange tube preform and the fin preform; and welding the heat exchange tube preforms and the fin preform together.

According to an embodiment of the present invention, the step of providing heat exchange tube preforms for forming heat exchange tubes comprises: providing heat exchange tube sheets having a predetermined size; and bending the heat exchange tube sheet to form a heat exchange tube preform in such way that the heat exchange tube preform has a part, the heat exchange tube has a part corresponding to the part of the heat exchange tube preform, and a size of the part of the heat exchange tube preform in the second direction is greater than a size of the part of the heat exchange tube in the second direction.

According to an embodiment of the present invention, the heat exchange tube preform comprises a first wall and a second wall opposite in the second direction; and in a plane defined by the second direction and the third direction, the first wall comprises an inclined part inclined relative to the second wall, and the inclined part gradually diverges away from the second wall in the third direction.

According to an embodiment of the present invention, the heat exchange tube preform comprises a first wall and a second wall opposite in the second direction; and in a plane defined by the second direction and the third direction, the first wall comprises two inclined parts inclined relative to the second wall, and the two inclined parts gradually diverge away from the second wall in the third direction from two edge parts of the heat exchange tube preform opposite in the third direction toward a middle part of the heat exchange tube preform in the third direction.

According to an embodiment of the present invention, the inclined part is in the shape of a flat plate.

According to an embodiment of the present invention, the heat exchange tube preform further comprises: a third wall and a fourth wall opposite in the third direction; and a partition wall for partitioning an inner cavity defined by the first wall, the second wall, the third wall, and the fourth wall into a plurality of channels, the partition wall supporting the inclined part of the first wall in the second direction.

According to an embodiment of the present invention, in the plane defined by the second direction and the third direction, the partition wall is in the shape of a zigzag line, and vertices of the zigzag line-shaped partition wall are in contact with the first wall and the second wall.

According to an embodiment of the present invention, the heat exchange tube sheet comprises two first parts for forming the first wall of a respective heat exchange tube, a second part for forming the second wall of the heat exchange tube, a third part for forming a third wall of the heat exchange tube, and a fourth part for forming a fourth wall of the heat exchange tube, the first wall and the second wall are opposite in the second direction, and the third wall and the fourth wall are opposite in the third direction; and the step of bending the heat exchange tube sheet to form a heat exchange tube preform comprises: bending the two first parts toward a middle part of the second part in the third direction respectively along two sides of the rectangular second part of the heat exchange tube sheet opposite in the third direction as bend lines.

According to an embodiment of the present invention, the step of bending the heat exchange tube sheet to form a heat exchange tube preform further comprises: before the step of bending the two first parts toward a middle part of the second part in the third direction respectively along two sides of the rectangular second part of the heat exchange tube sheet opposite in the third direction as bend lines, providing a partition wall and placing the partition wall on the second part, wherein the partition wall is in the shape of a zigzag line, and vertices of the zigzag line-shaped partition wall have heights gradually increasing in the third direction from the two sides of the second part opposite in the third direction toward a middle part of the second part in the third direction.

According to an embodiment of the present invention, the step of providing a fin preform for forming a fin comprises: providing a fin plate having a predetermined size; and forming a fin preform by using the fin plate, wherein the fin preform comprises a fin body and further comprises: a notch formed in the fin body; and a first flange extending from at least one of two edges of the notch opposite in the second direction toward one side of the fin body in the first direction, such that a fin groove is formed.

According to an embodiment of the present invention, the step of providing a fin preform for forming a fin comprises:

providing a fin plate having a predetermined size; and forming a fin preform by using the fin plate, wherein the fin preform comprises a fin body and further comprises: a notch formed in the fin body; and two first flanges respectively extending from two edges of the notch opposite in the second direction toward the same side or different sides of the fin body in the first direction, such that a fin groove is formed.

According to an embodiment of the present invention, the step of providing a fin preform for forming a fin comprises: providing a fin plate having a predetermined size; and forming a fin preform by using the fin plate, wherein the fin preform comprises a fin body and further comprises: a notch formed in the fin body; a first flange extending from at least one of two edges of the notch opposite in the second direction toward one side of the fin body in the first direction; and a second flange inclined, toward the other side of the fin body in the first direction, from an edge of the first flange remote from the fin body toward a middle part of the notch in the second direction, such that a fin groove is formed.

According to an embodiment of the present invention, the step of providing a fin preform for forming a fin comprises: providing a fin plate having a predetermined size; and forming a fin preform by using the fin plate, wherein the fin preform comprises a fin body and further comprises: a notch formed in the fin body; two first flanges respectively extending from two edges of the notch opposite in the second direction toward the same side or different sides of the fin body in the first direction; and a second flange inclined, toward the other side of the fin body in the first direction opposite to the side on which at least one of the two first flanges is located, from an edge of the at least one of the two first flanges remote from the fin body toward a middle part of the notch in the second direction, such that a fin groove is formed.

According to an embodiment of the present invention, in a plane defined by the first direction and the second direction, a distance between the first flange and a center line of the notch extending in the third direction gradually decreases in the first direction from an edge of the first flange connected to the fin body to an edge of the first flange remote from the fin body.

According to an embodiment of the present invention, in a plane defined by the first direction and the second direction, a distance between the second flange and a center line of the notch extending in the third direction gradually decreases in the first direction from an edge of the second flange connected to the first flange to an edge of the second flange remote from the first flange.

According to an embodiment of the present invention, each first flange is an integral first flange; or each first flange comprises a plurality of separate first sub-flanges.

According to an embodiment of the present invention, each second flange is an integral second flange; or each second flange comprises a plurality of separate second sub-flanges.

According to an embodiment of the present invention, the heat exchange tube preform is inserted into the fin groove of the fin preform in the third direction through the opening.

The heat exchanger according to the embodiment of the present invention, for example, improves welding quality of heat exchange tubes and a fin of the heat exchanger.

DETAILED DESCRIPTION

A method for producing a heat exchanger according to an embodiment of the present invention is described below with reference to FIGS. 1 to 16.

Figure 1:
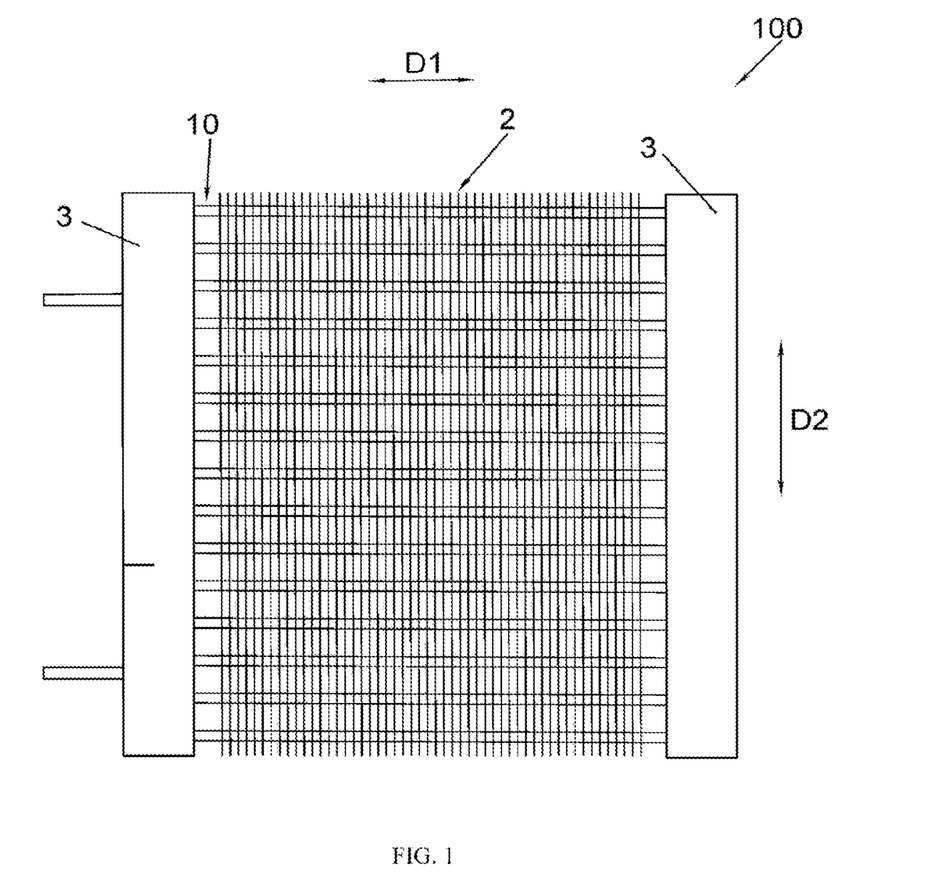
FIG. 1 is a schematic front view of a heat exchanger according to an embodiment of the present invention.
Figure 2:
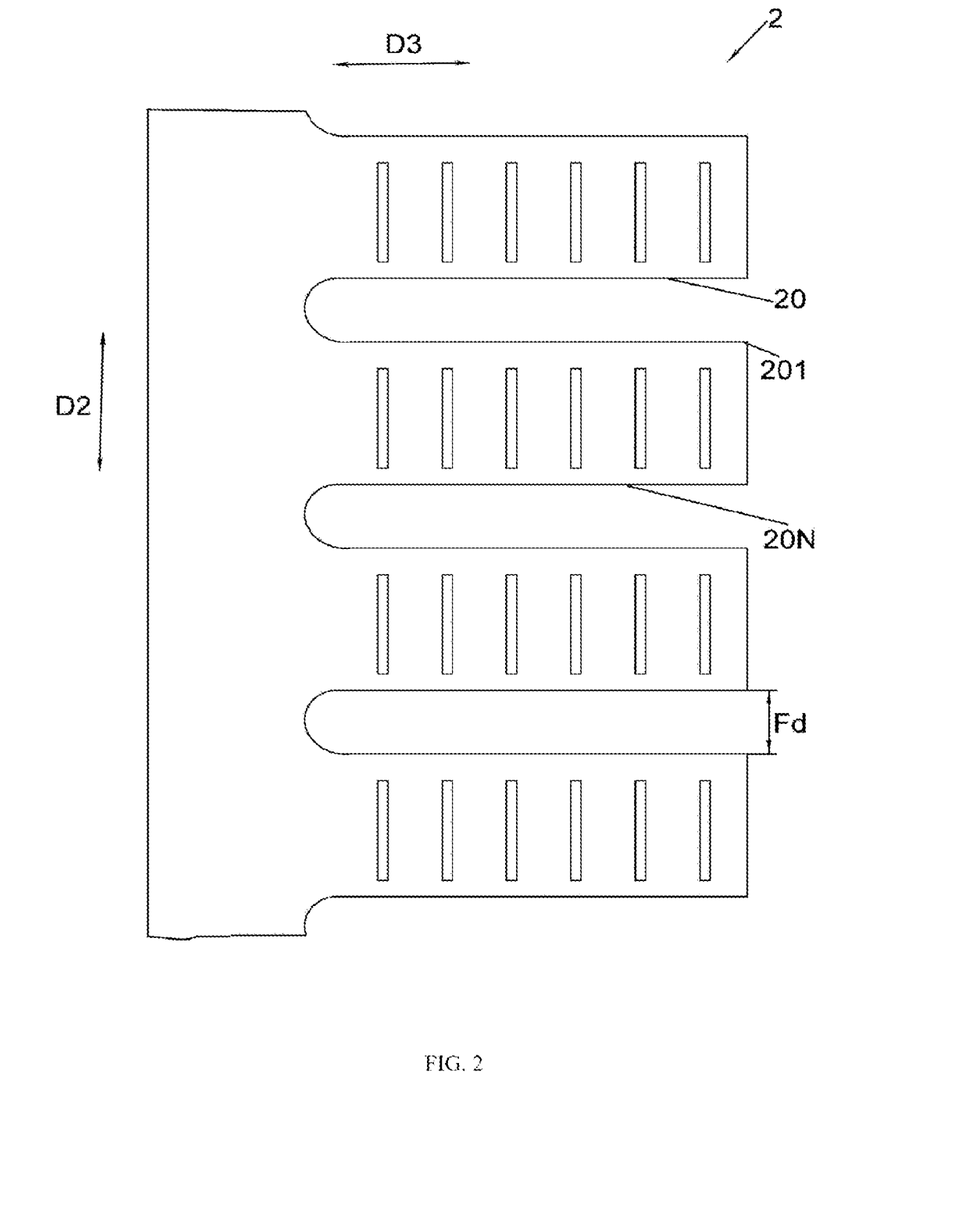
FIG. 2 is a schematic front view of a fin of the heat exchanger according to the embodiment of the present invention.

Referring to FIGS. 1 to 16, the embodiment of the present invention provides a method for producing a heat exchanger 100. As shown in FIGS. 1 and 2, the heat exchanger 100 comprises: a plurality of heat exchange tubes 10, the plurality of heat exchange tubes 10 extending in a first direction D1 and being arranged in a second direction D2 perpendicular to the first direction D1; and a fin 2, the fin 2 being provided with a plurality of fin grooves 20 for mounting the plurality of heat exchange tubes 10 respectively, and the fin groove 20 being provided with an opening 201 on one side in a third direction D3 perpendicular to the first direction D1 and the second direction D2. In addition, the heat exchanger 100 further comprises: manifolds 3, the manifolds 3 being connected to two ends of the heat exchange tubes 10 and being in fluid communication with the heat exchange tubes 10. The heat exchange tubes 10 may be flat tubes or other suitable tubes. The heat exchanger 100 may be a microchannel heat exchanger.

Referring to FIGS. 1 to 16, in some embodiments of the present invention, the method comprises the steps of: providing heat exchange tube preforms 11 for forming heat exchange tubes 10, the heat exchange tube preform 11 having a maximum size Td' in the second direction D2; providing a fin preform 21 for forming a fin 2, fin groove 20 of the fin preform 21 having a minimum size in the second direction, and the maximum size Td' being greater than the minimum size; inserting the heat exchange tube preforms 11 into the fin grooves 20 of the fin preform 21, so as to generate a predetermined contact pressure between the heat exchange tube preform 11 and the fin preform 21 by means of an elastic deformation of at least one of the heat exchange tube preform 11 and the fin preform 21; and welding the heat exchange tube preforms 11 and the fin preform 21 together. For example, the heat exchange tube preform 11 is inserted into the fin groove 20 of the fin preform 21 in the third direction D3 through the opening 201. An insertion direction DI is shown in FIG. 6. It can be seen from FIG. 6 that the insertion direction DI is parallel to the third direction D3.

In some embodiments of the present invention, the welding pass rate of the heat exchanger 100 is improved by improving the quality of contact between the fin preform 21 and the heat exchange tube preforms 11. For example, heat exchange tube preform 11 is formed by bending a sheet multiple times by using a rolling process. The formed sheet has a rebound force in a thickness direction of the heat exchange tube preform 11, and the thickness of the heat exchange tube preform 11 varies due to a different squeezing force, so that the thickness of the heat exchange tube preform 11 varies within a predetermined thickness range. When the heat exchange tube preform 11 is inserted into a respective fin groove 20 of the fin preform 21, an interaction force exists between the heat exchange tube preform 11 and the fin preform 21. This ensures that the heat exchange tube preform 11 and the fin groove 20 of the fin preform 21 are always kept in a close contact state, and finally ensures the welding pass rate of the heat exchanger.

Figure 3:
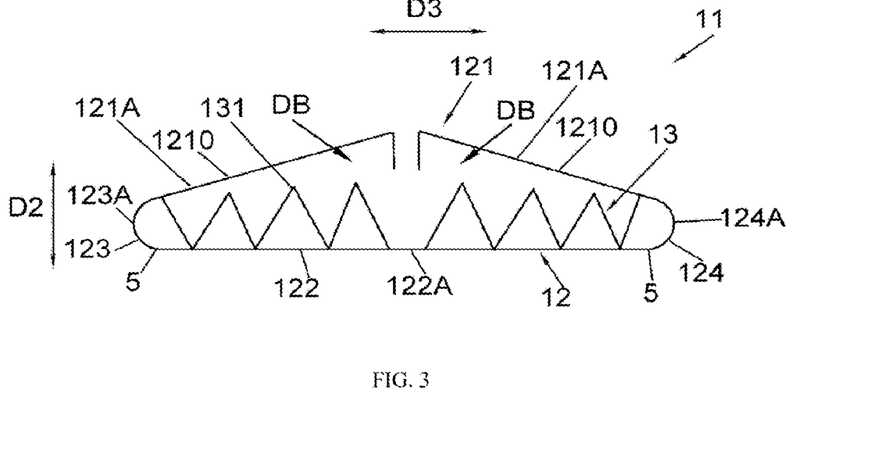
FIG. 3 is a schematic sectional view of a heat exchange tube preform of the heat exchanger according to the embodiment of the present invention, showing a bending mode of the heat exchange tube preform.
Figure 4:
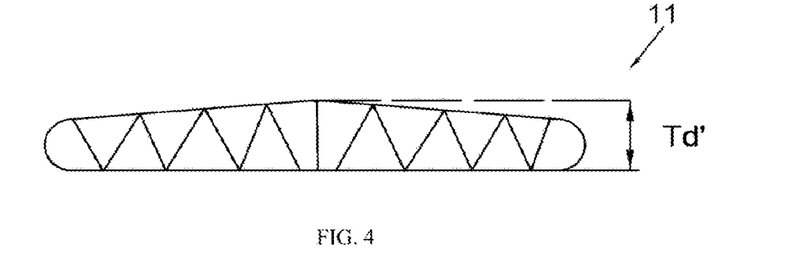
FIG. 4 is a schematic sectional view of the heat exchange tube preform of the heat exchanger according to the embodiment of the present invention, showing a bent state of the heat exchange tube preform.
Figure 5:
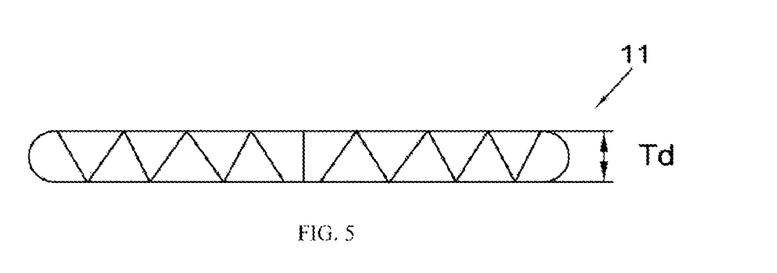
FIG. 5 is a schematic sectional view of the heat exchange tube preform of the heat exchanger according to the embodiment of the present invention, showing a state of the heat exchange tube preform after the heat exchange tube preform is inserted into a fin groove of a fin preform.
Figure 6:
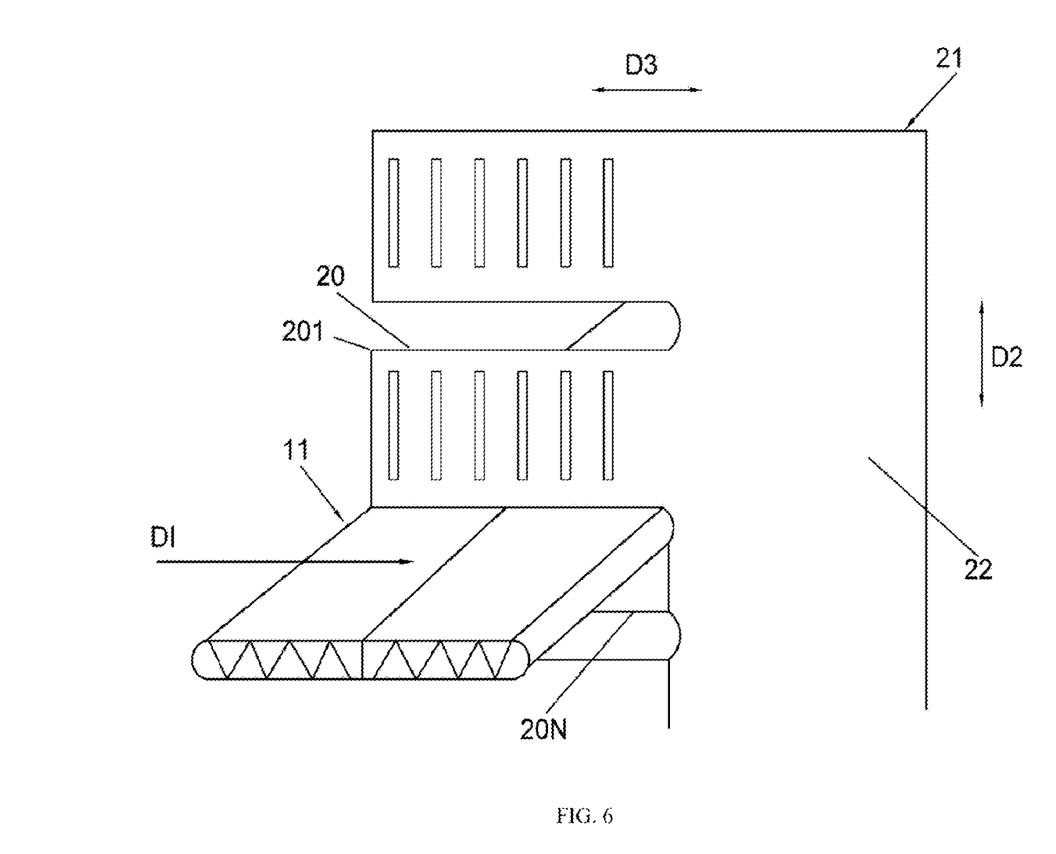
FIG. 6 is a schematic perspective view of a heat exchange tube preform and a fin preform of an assembled heat exchanger according to the embodiment of the present invention, with the fin preform having no first flange.

Referring to FIGS. 3 to 5, in some embodiments of the present invention, the step of providing heat exchange tube preforms 11 for forming heat exchange tubes 10 comprises: providing heat exchange tube sheets 12 having a predetermined size; and bending the heat exchange tube sheet 12 to form a heat exchange tube preform 11 in such a way that the heat exchange tube preform 11 has a part, the heat exchange tube 10 has a part corresponding to the part of the heat exchange tube preform 11, and a size of the part of the heat exchange tube preform 11 in the second direction D2 is greater than a size of the part of the heat exchange tube 10 in the second direction. That is, after the heat exchange tube preform 11 is inserted into the fin groove 20 of the fin preform 21, the heat exchange tube preform 11 becomes the heat exchange tube 10, and the part of the heat exchange tube preform 11 becomes the part of the heat exchange tube 10. The size of the part of the heat exchange tube preform 11 in the second direction D2 is greater than the size of the part of the heat exchange tube 10 in the second direction D2.

Referring to FIGS. 3 to 5, in an example of the present invention, the heat exchange tube preform 11 comprises a first wall 121 and a second wall 122 opposite in the second direction D2. In a plane defined by the second direction D2 and the third direction D3, the first wall 121 comprises an inclined part 1210 inclined relative to the second wall 122, and the inclined part 1210 gradually diverges away from the second wall 122 in the third direction D3. In an illustrated example of the present invention, the heat exchange tube preform 11 comprises a first wall 121 and a second wall 122 opposite in the second direction D2. In a plane defined by the second direction D2 and the third direction D3, the first wall 121 comprises two inclined parts 1210 inclined relative to the second wall 122, and the two inclined parts 1210 gradually diverge away from the second wall 122 in the third direction D3 from two edge parts of the heat exchange tube preform 11 opposite in the third direction D3 toward a middle part of the heat exchange tube preform 11 in the third direction D3. The inclined part 1210 may be in the shape of a flat plate.

Referring to FIGS. 3 to 5, in some embodiments of the present invention, the heat exchange tube preform 11 further comprises: a third wall 123 and a fourth wall 124 opposite in the third direction D3; and a partition wall 13 for partitioning an inner cavity defined by the first wall 121, the second wall 122, the third wall 123, and the fourth wall 124 into a plurality of channels, the partition wall 13 supporting the inclined part 1210 of the first wall 121 in the second direction D2. For example, in the plane defined by the second direction D2 and the third direction D3, the partition wall 13 is in the shape of a zigzag line, and vertices 131 of the zigzag line-shaped partition wall 13 are in contact with the first wall 121 and the second wall 122.

Referring to FIGS. 3 to 5, in some embodiments of the present invention, the heat exchange tube sheet 12 comprises two first parts 121A for forming the first wall 121 of a respective heat exchange tube 10, a second part 122A for forming the second wall 122 of the heat exchange tube 10, a third part 123A for forming the third wall 123 of the heat exchange tube 10, and a fourth part 124A for forming the fourth wall 124 of the heat exchange tube 10, the first wall 121 and the second wall 122 are opposite in the second direction D2, and the third wall 123 and the fourth wall 124 are opposite in the third direction D3. The step of bending the heat exchange tube sheet 12 to form a heat exchange tube preform 11 comprises: bending the two first parts 121A toward a middle part of the second part 122A in the third direction D3 respectively along two sides 5 of the rectangular second part 122A of the heat exchange tube sheet 12 opposite in the third direction D3 as bend lines. A bending direction DB is shown in FIG. 3.

Referring to FIGS. 3 to 5, in some embodiments of the present invention, the step of bending the heat exchange tube sheet 12 to form a heat exchange tube preform 11 further comprises: before the step of bending the two first parts 121A toward a middle part of the second part 122A in the third direction D3 respectively along two sides 5 of the rectangular second part 122A of the heat exchange tube sheet 12 opposite in the third direction D3 as bend lines, providing a partition wall 13 and placing the partition wall 13 on the second part 122A. The partition wall 13 is in the shape of a zigzag line, and vertices 131 of the zigzag line-shaped partition wall 13 have heights gradually increasing in the third direction D3 from the two sides 5 of the second part 122A opposite in the third direction D3 toward a middle part of the second part 122A in the third direction D3.

Referring to FIG. 2, and FIGS. 6 to 16, in some embodiments of the present invention, the fin preform 21 is provided with a plurality of fin grooves 20, and the fin grooves 20 are arranged in parallel with each other at predetermined intervals. As shown in FIG. 2, a width of the fin groove 20 is Fd. Referring to FIGS. 3 to 5, in some embodiments of the present invention, the heat exchange tube preform 11 is formed by bending a sheet, and an outer wall part of the produced heat exchange tube preform 11 is given a certain slope by adjusting a bending pressure of a bending device of the heat exchange tube preform 11. A maximum size in the thickness direction of the heat exchange tube preform 11 is Td', and a thickness of the heat exchange tube preform 11 with two sides pressed is Td, where Td'>Fd>Td. As shown in FIG. 6, when the heat exchange tube preform 11 is inserted into the fin groove 20 of the fin preform 21 in the insertion direction DI, since the width of the fin groove 20 is less than the maximum size of the heat exchange tube preform 11 in the thickness direction, the slope of an inclined part of the outer wall of the heat exchange tube preform 11 gradually decreases, resulting in a gradual decrease in the thickness of the heat exchange tube preform 11. Therefore, in the assembly process of the heat exchanger, close contact between the heat exchange tube preform 11 and the fin preform 21 is achieved. Even if the fin preform 21 is deformed and the size of the fin groove 20 also changes during the transportation or assembly process of the heat exchanger, the inclined part of the outer wall of the heat exchange tube preform 11 will correspondingly deform and be in contact with the fin groove 20 of the fin preform 21, thereby achieving the close contact between the heat exchange tube preform 11 and the fin preform 21.

In some embodiments of the present invention, referring to FIGS. 7 to 16, the step of providing a fin preform 21 for forming a fin 2 comprises: providing a fin plate having a predetermined size; and forming a fin preform 21 by using the fin plate. The fin preform 21 comprises a fin body 22, and the fin preform 21 further comprises: a notch 20N formed in the fin body 22; and a first flange 23 extending from at least one of two edges of the notch 20N opposite in the second direction D2 toward one side of the fin body 22 in the first direction D1, such that a fin groove 20 is formed. In an illustrated example, the step of providing a fin preform 21 for forming a fin 2 comprises: providing a fin plate having a predetermined size; and forming a fin preform 21 by using the fin plate. The fin preform 21 comprises a fin body 22, and the fin preform 21 further comprises: a notch 20N formed in the fin body 22; and two first flanges 23 respectively extending from two edges of the notch 20N opposite in the second direction D2 toward the same side or different sides of the fin body 22 in the first direction D1, such that a fin groove 20 is formed. For example, in a plane defined by the first direction D1 and the second direction D2, a distance between the first flange 23 and a center line of the notch 20N extending in the third direction D3 gradually decreases in the first direction D1 from an edge of the first flange connected to the fin body 22 to an edge of the first flange remote from the fin body 22. For example, the flange 23 is not perpendicular to the fin body 22 in the direction D1, but is inclined relative to the fin body 22 toward the notch 20N.

Referring to FIG. 2 and FIGS. 7 to 10, in some embodiments of the present invention, the fin preform 21 comprises a plate-shaped fin body 22 parallel to the plane defined by the second direction D2 and the third direction D3. The fin preform 21 further comprises: a plurality of notches 20N formed in the fin body 22 of the fin preform 21, the notches 20N being arranged in parallel with each other at predetermined intervals; and first flanges 23 which protrude from or are bent from edges of the notch 20N of the fin preform 21, such that a fin groove 20 is formed. In the embodiment shown in FIG. 7, the first flanges 23 are on different sides of the fin body 22 in the first direction D1. In the embodiment shown in FIG. 8, the first flanges 23 are on the same side of the fin body 22 in the first direction D1. Referring to FIGS. 7 to 10, a cross section of the first flange 23 in the plane defined by the first direction D1 and the second direction D2 may be a curve, and a minimum width between two first flanges 23 protruding from the edges of the same notch 20N is Fd, that is, the minimum width of the fin groove 20 is Fd. Referring to FIGS. 3 to 5, the heat exchange tube preform 11 is formed by bending a sheet, and an outer wall part of the produced heat exchange tube preform 11 is given a certain slope by adjusting a bending pressure of a bending device of the heat exchange tube preform 11. A maximum size in the thickness direction of the heat exchange tube preform 11 is Td', and a thickness of the heat exchange tube preform 11 with two sides pressed is Td, where Td'>Fd>Td. As shown in FIG. 6, when the heat exchange tube preform 11 is inserted into the fin groove 20 of the fin preform 21 in the insertion direction DI, since the width of the fin groove 20 is less than the maximum size of the heat exchange tube preform 11 in the thickness direction, the slope of an inclined part of the outer wall of the heat exchange tube preform 11 gradually decreases, resulting in a gradual decrease in the thickness of the heat exchange tube preform 11. Therefore, in the assembly process of the heat exchanger, close contact between the heat exchange tube preform 11 and the fin preform 21 is achieved. Even if the fin preform 21 is deformed and the size of the fin groove 20 also changes during the transportation or assembly process of the heat exchanger, the inclined part of the outer wall of the heat exchange tube preform 11 will correspondingly deform and be in contact with the fin groove 20 of the fin preform 21, thereby achieving the close contact between the heat exchange tube preform 11 and the fin preform 21. In addition, since Td'>Td>Fd, when the heat exchange tube preform 11 is inserted into the fin groove 20 of the fin preform 21 in the insertion direction DI, the slope of the inclined part of the outer wall of the heat exchange tube preform 11 gradually decreases because the width of the fin groove 20 is less than the maximum size of the heat exchange tube preform 11 in the thickness direction. At the same time, the two first flanges 23 protruding from the edges of the same notch 20N begin to deform. The minimum width Fd between the two first flanges 23, that is, the minimum width Fd of the fin groove 20, begins to increase. When the heat exchange tube preform 11 is completely inserted into the fin groove 20 of the fin preform 21, the deformation of the two first flanges 23 protruding from the edges of the same notch 20N stops, thereby achieving the close contact between the heat exchange tube preform 11 and the fin preform 21.

Figure 11:
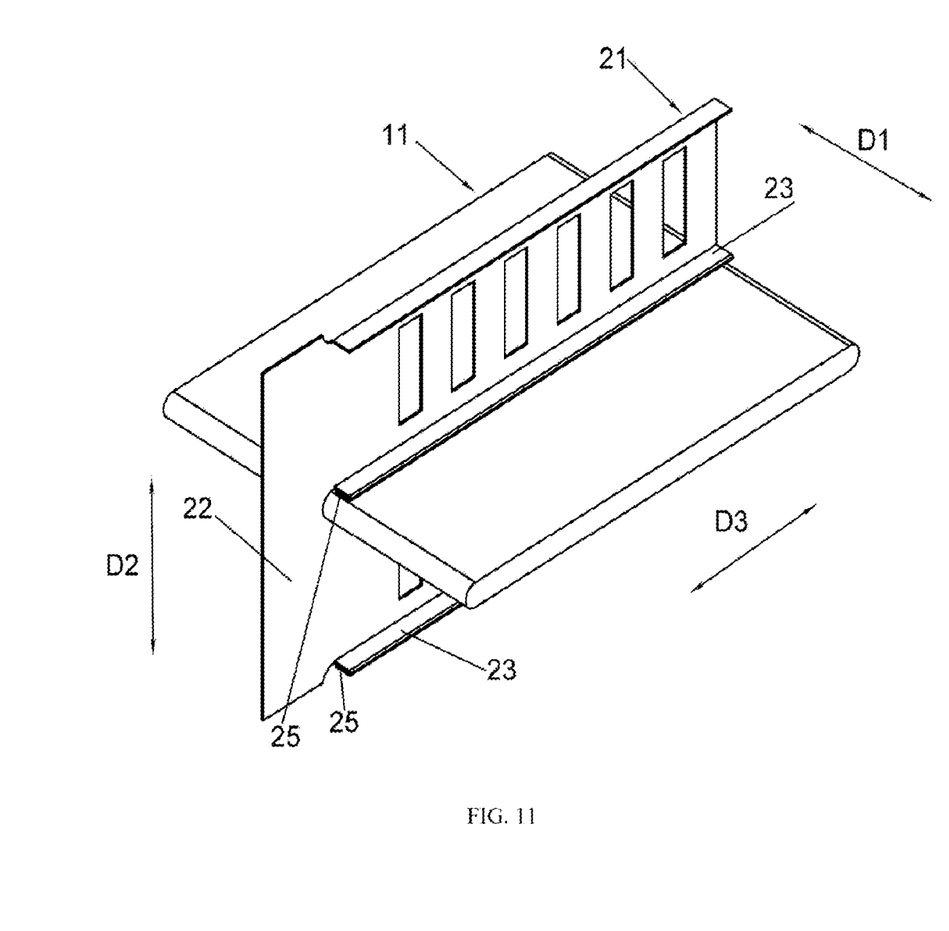
FIG. 11 is a schematic perspective view of a heat exchange tube preform and a fin preform of an assembled heat exchanger according to still another embodiment of the present invention, with the fin preform being provided with a first flange and a second flange.
Figure 12:
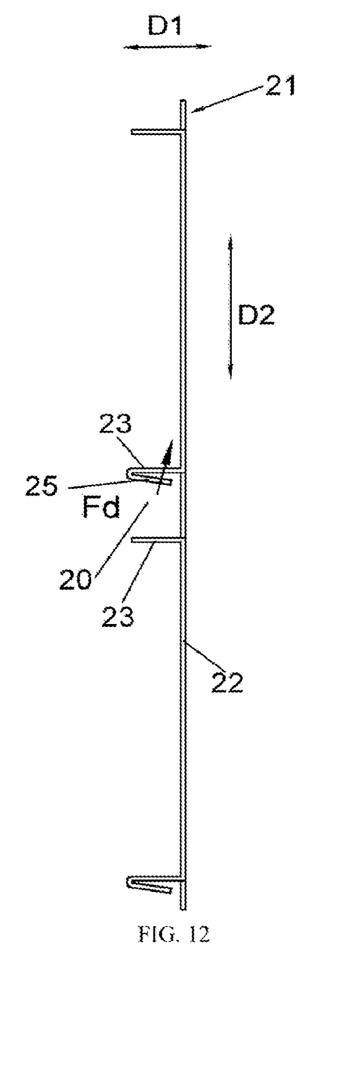
FIG. 12 is a schematic side view of the fin preform of the heat exchanger according to still another embodiment of the present invention.
Figure 13:
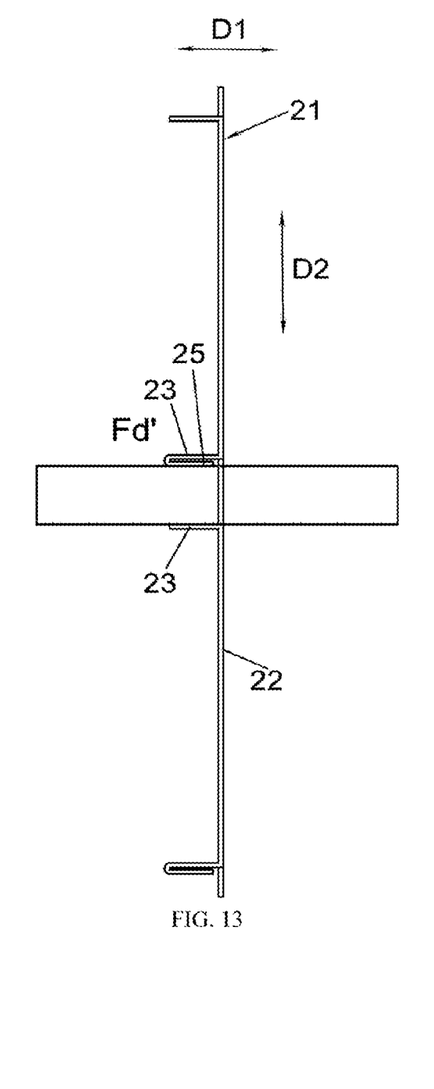
FIG. 13 is a schematic sectional view of the assembled heat exchange tube preform and fin preform according to still another embodiment of the present invention.
Figure 14:
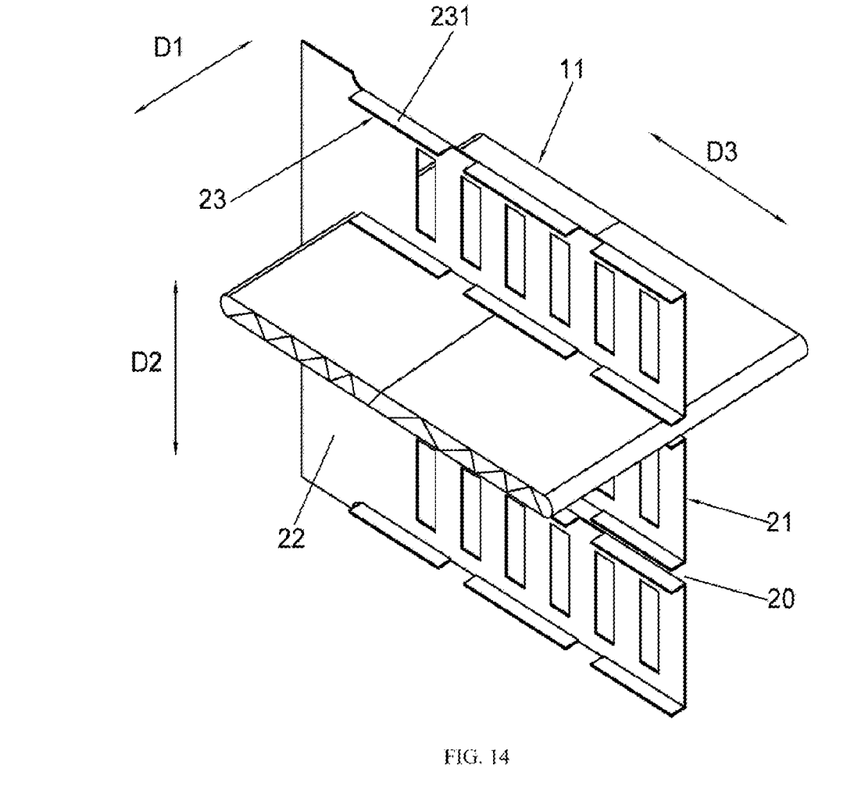
FIG. 14 is a schematic perspective view of a heat exchange tube preform and a fin preform of an assembled heat exchanger according to still yet another embodiment of the present invention, with each first flange of the fin preform comprising a plurality of separate first sub-flanges.

In some embodiments of the present invention, referring to FIGS. 11 to 13, the step of providing a fin preform 21 for forming a fin 2 comprises: providing a fin plate having a predetermined size; and forming a fin preform 21 by using the fin plate. The fin preform 21 comprises a fin body 22, and the fin preform 21 further comprises: a notch 20N formed in the fin body 22; a first flange 23 extending from at least one of two edges of the notch 20N opposite in the second direction D2 toward one side of the fin body 22 in the first direction D1; and a second flange 25 inclined, toward the other side of the fin body 22 in the first direction D1, from an edge of the first flange 23 remote from the fin body 22 toward a middle part of the notch 20N in the second direction D2, such that a fin groove 20 is formed.

In some other embodiments of the present invention, referring to FIGS. 11 to 13, the step of providing a fin preform 21 for forming a fin 2 comprises: providing a fin plate having a predetermined size; and forming a fin preform 21 by using the fin plate. The fin preform 21 comprises a fin body 22, and the fin preform 21 further comprises: a notch 20N formed in the fin body 22; two first flanges 23 respectively extending from two edges of the notch 20N opposite in the second direction D2 toward the same side or different sides of the fin body 22 in the first direction D1; and a second flange 25 inclined, toward the other side of the fin body 22 in the first direction D1 opposite to the side on which at least one of the two first flanges 23 is located, from an edge of the at least one of the two first flanges 23 remote from the fin body 22 toward the middle part of the notch 20N in the second direction D2, such that a fin groove 20 is formed.

Referring to FIGS. 11 to 13, in the embodiments of the present invention, in a plane defined by the first direction D1 and the second direction D2, a distance between the second flange 25 and a center line of the notch 20N extending in the third direction D3 gradually decreases in the first direction D1 from an edge of the second flange connected to the first flange 23 to an edge of the second flange remote from the first flange 23.

Referring to FIG. 2 and FIGS. 11 to 13, in some embodiments of the present invention, the fin preform 21 comprises a plate-shaped fin body 22 parallel to the plane defined by the second direction D2 and the third direction D3. The fin preform 21 further comprises: a plurality of notches 20N formed in the fin body 22 of the fin preform 21, the notches 20N being arranged in parallel with each other at predetermined intervals; two first flanges 23 protruding from two opposite edges of the notch 20N of the fin preform 21; and a second flange 25 which protrudes from or is bent from an edge of at least one of the two first flanges 23 remote from the fin body 22 toward the middle part of the notch 20N in the second direction, such that a fin groove 20 is formed. As shown in FIG. 12, the minimum width between the first flange 23 and the second flange 25 or the minimum width between two second flanges 25 corresponding to the same notch 20N of the fin preform 21 is Fd, that is, the minimum width of the fin groove 20 is Fd. Referring to FIGS. 3 to 5, in some embodiments of the present invention, the heat exchange tube preform 11 is formed by bending a sheet, and an outer wall part of the produced heat exchange tube preform 11 is given a certain slope by adjusting a bending pressure of a bending device of the heat exchange tube preform 11. A maximum size in the thickness direction of the heat exchange tube preform 11 is Td', and a thickness of the heat exchange tube preform 11 with two sides pressed is Td, where Td'>Fd>Td. As shown in FIG. 6, when the heat exchange tube preform 11 is inserted into the fin groove 20 of the fin preform 21 in the insertion direction DI, since the width of the fin groove 20 is less than the maximum size of the heat exchange tube preform 11 in the thickness direction, the slope of an inclined part of the outer wall of the heat exchange tube preform 11 gradually decreases, resulting in a gradual decrease in the thickness of the heat exchange tube preform 11. Therefore, in the assembly process of the heat exchanger, close contact between the heat exchange tube preform 11 and the fin preform 21 is achieved. Even if the fin preform 21 is deformed and the size of the fin groove 20 also changes during the transportation or assembly process of the heat exchanger, the inclined part of the outer wall of the heat exchange tube preform 11 will correspondingly deform and be in contact with the fin groove 20 of the fin preform 21, thereby achieving the close contact between the heat exchange tube preform 11 and the fin preform 21. In addition, since Td'>Td>Fd, when the heat exchange tube preform 11 is inserted into the fin groove 20 of the fin preform 21 in the insertion direction DI, the slope of the inclined part of the outer wall of the heat exchange tube preform 11 gradually decreases because the width of the fin groove 20 is less than the maximum size of the heat exchange tube preform 11 in the thickness direction. At the same time, one second flange 25 or two second flanges 25 corresponding to the same notch 20N of the fin preform 21 begin to deform, and the minimum width Fd between the first flange 23 and the second flange 25 or the minimum width Fd between two second flanges 25 corresponding to the same notch 20N of the fin preform 21, that is, the minimum width Fd of the fin groove 20, begins to increase. The first flange 23 then begins to deform until the heat exchange tube preform 11 is completely inserted into the fin groove 20 of the fin preform 21, and the deformation of the first flange 23 and the second flange 25 of the fin groove 20 is stopped, thereby achieving close contact between the heat exchange tube preform 11 and the fin preform 21.

Figure 7:
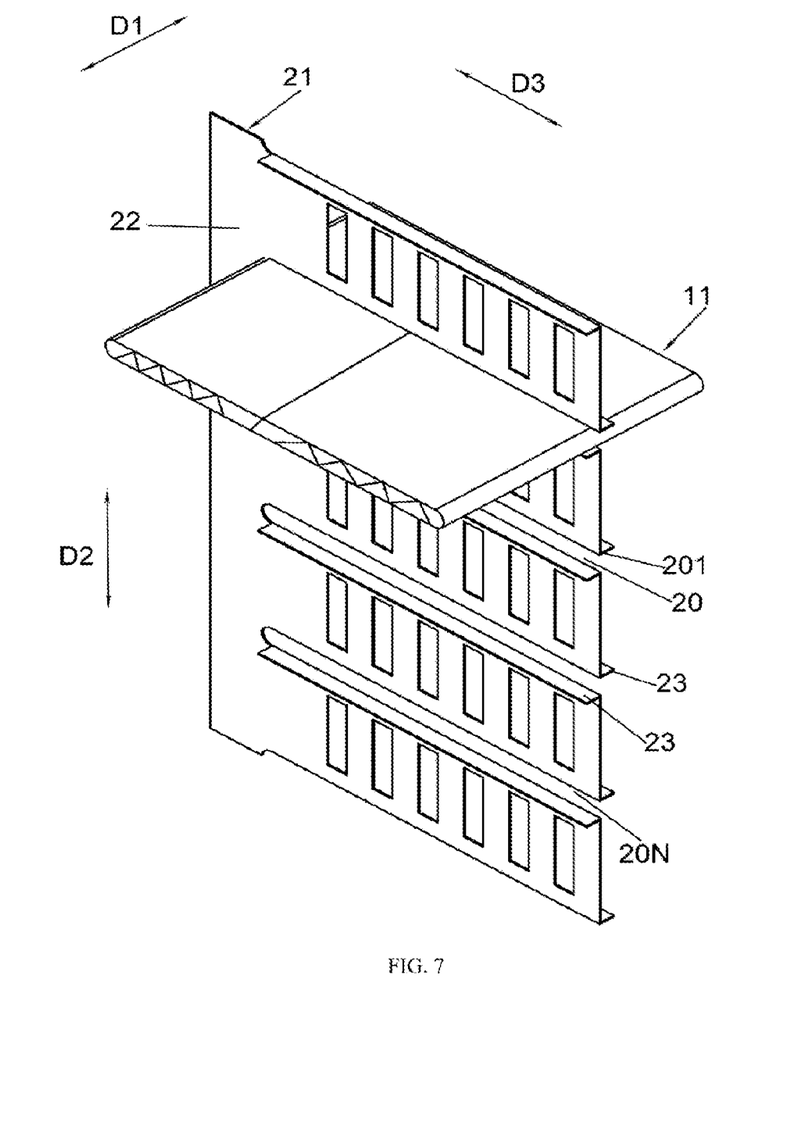
FIG. 7 is a schematic perspective view of the heat exchange tube preform and the fin preform of the assembled heat exchanger according to the embodiment of the present invention, with two first flanges of the fin preform that correspond to each notch extending toward different sides of a fin body.
Figure 8:
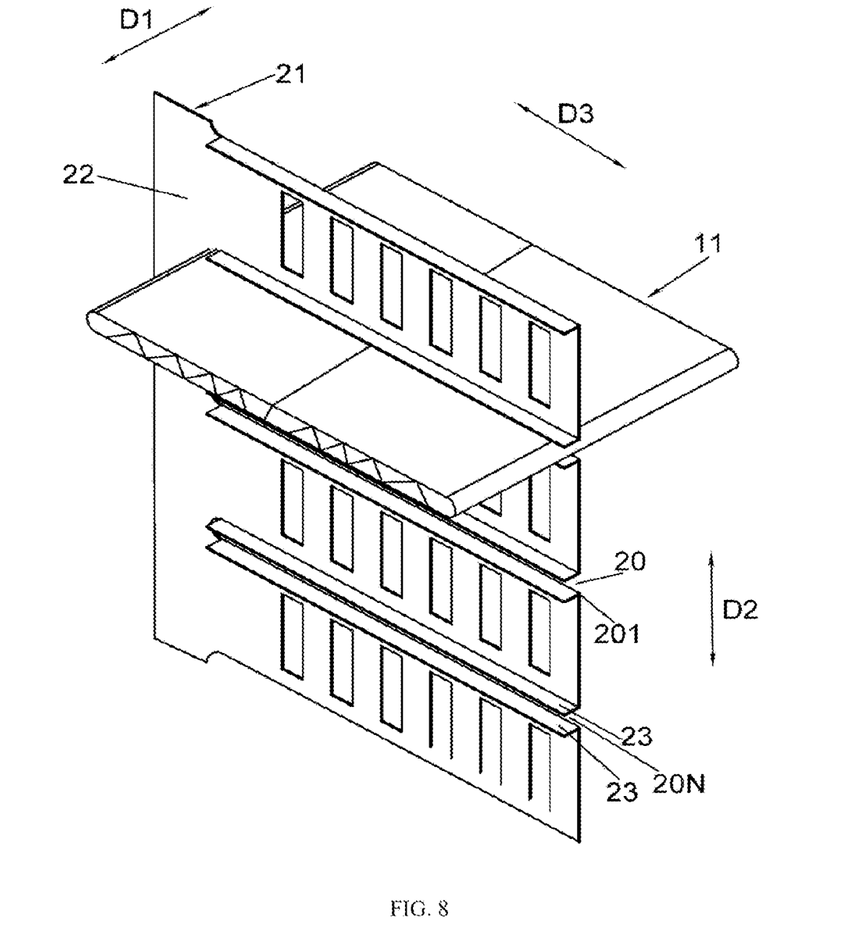
FIG. 8 is a schematic perspective view of a heat exchange tube preform and a fin preform of an assembled heat exchanger according to another embodiment of the present invention, with two first flanges of the fin preform that correspond to each notch extending toward the same side of a fin body.
Figure 9:
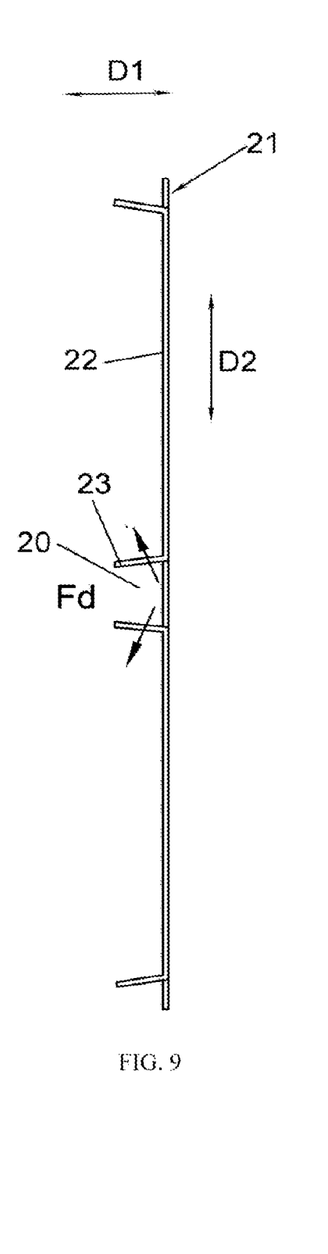
FIG. 9 is a schematic side view of the fin preform of the heat exchanger according to another embodiment of the present invention.
Figure 10:
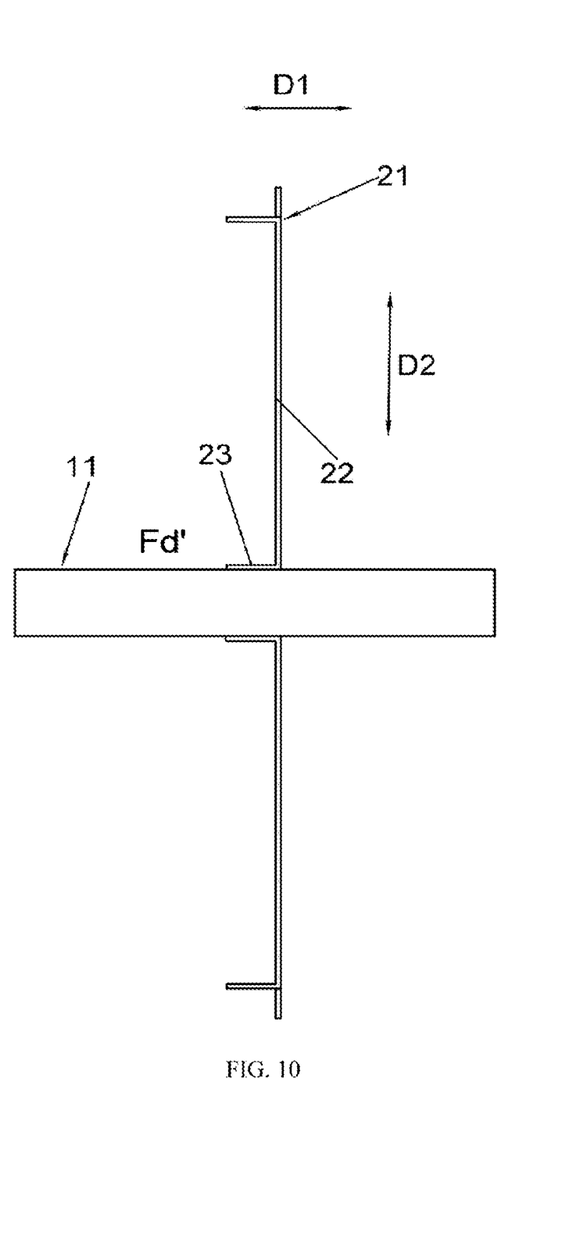
FIG. 10 is a schematic sectional view of the assembled heat exchange tube preform and fin preform according to another embodiment of the present invention.

In some embodiments of the present invention, referring to FIGS. 7, 8 and 11, each first flange 23 is an integral first flange 23. Alternatively, referring to FIG. 14, each first flange 23 comprises a plurality of separate first sub-flanges 231. In some embodiments of the present invention, referring to FIG. 11, each second flange 25 is an integral second flange 25. Alternatively, each second flange 25 comprises a plurality of separate second sub-flanges.

Figure 15:
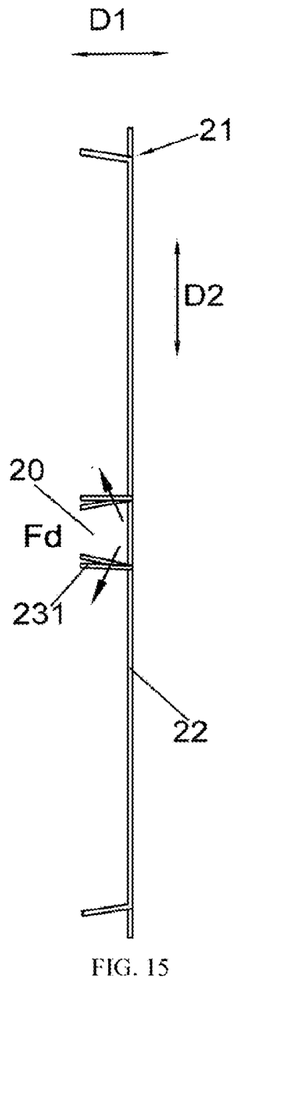
FIG. 15 is a schematic side view of the fin preform of the heat exchanger according to still yet another embodiment of the present invention.
Figure 16:
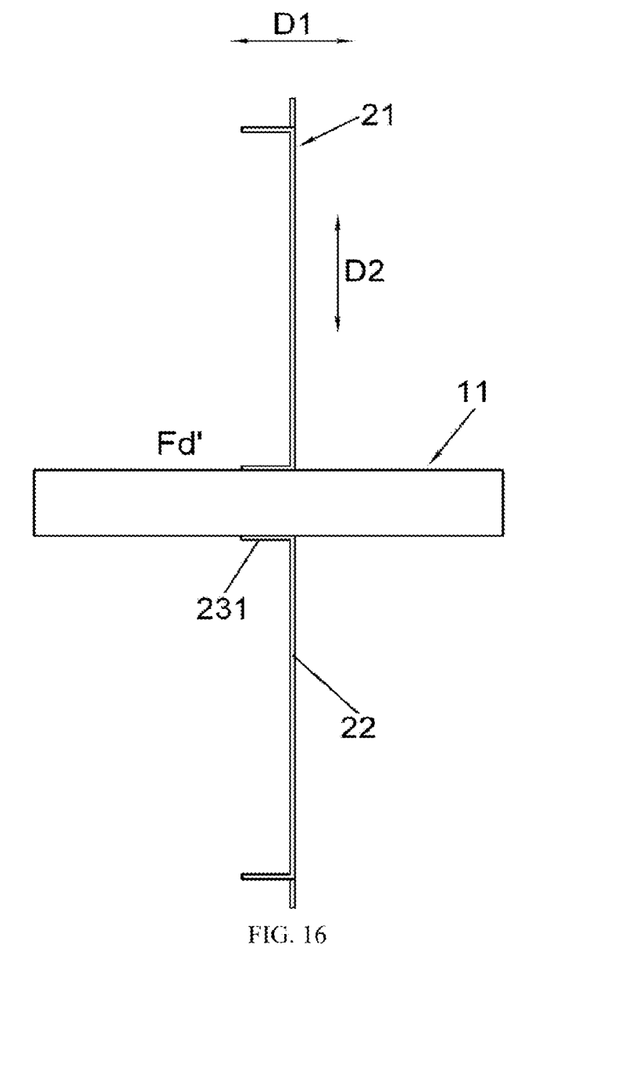
FIG. 16 is a schematic sectional view of the assembled heat exchange tube preform and fin preform according to still yet another embodiment of the present invention.

Referring to FIG. 2 and FIGS. 14 to 16, in some embodiments of the present invention, the fin preform 21 comprises a plate-shaped fin body 22 parallel to the plane defined by the second direction D2 and the third direction D3. The fin preform 21 further comprises: a plurality of notches 20N formed in the fin body 22 of the fin preform 21, the notches 20N being arranged in parallel with each other at predetermined intervals; and a first flange 23 which protrudes from or is bent from an edge of the notch 20N of the fin preform 21, such that a fin groove 20 is formed. At least one first flange 23 of two first flanges 23 protruding from or bent from two opposite edges of the notch 20N of the fin preform 21 is divided into a plurality of first sub-flanges 231 arranged in the third direction D3. For example, a plurality of first sub-flanges 231 are inclined at the same angle relative to the first direction D1. As shown in FIG. 15, the minimum width between the two first flanges 23 protruding from or bent from two opposite edges of the same fin groove 20 is Fd. That is, the minimum width of the fin groove 20 is Fd. Referring to FIGS. 3 to 5, the heat exchange tube preform 11 is formed by bending a sheet, and an outer wall part of the produced heat exchange tube preform 11 is given a certain slope by adjusting a bending pressure of a bending device of the heat exchange tube preform 11. A maximum size in the thickness direction of the heat exchange tube preform 11 is Td', and a thickness of the heat exchange tube preform 11 with two sides pressed is Td, where Td'>Fd>Td. As shown in FIG. 6, when the heat exchange tube preform 11 is inserted into the fin groove 20 of the fin preform 21 in the insertion direction DI, since the width of the fin groove 20 is less than the maximum size of the heat exchange tube preform 11 in the thickness direction, the slope of an inclined part of the outer wall of the heat exchange tube preform 11 gradually decreases, resulting in a gradual decrease in the thickness of the heat exchange tube preform 11. Therefore, in the assembly process of the heat exchanger, close contact between the heat exchange tube preform 11 and the fin preform 21 is achieved. Even if the fin preform 21 is deformed and the size of the fin groove 20 also changes during the transportation or assembly process of the heat exchanger, the inclined part of the outer wall of the heat exchange tube preform 11 will correspondingly deform and be in contact with the fin groove 20 of the fin preform 21, thereby achieving the close contact between the heat exchange tube preform 11 and the fin preform 21. In addition, since Td'>Td>Fd, when the heat exchange tube preform 11 is inserted into the fin groove 20 of the fin preform 21 in the insertion direction DI, the slope of the inclined part of the outer wall of the heat exchange tube preform 11 gradually decreases because the width of the fin groove 20 is less than the maximum size of the heat exchange tube preform 11 in the thickness direction. At the same time, the two first flanges 23 protruding from the edges of the same notch 20N begin to deform. The minimum width Fd between the two first flanges 23, that is, the minimum width Fd of the fin groove 20, begins to increase. When the heat exchange tube preform 11 is completely inserted into the fin groove 20 of the fin preform 21, the deformation of the two first flanges 23 protruding from the edges of the same notch 20N stops, thereby achieving the close contact between the heat exchange tube preform 11 and the fin preform 21.

An embodiment of the present invention provides a method for producing a heat exchanger. According to the embodiment of the present invention, heat exchange tube preforms 11 and a fin preform 21 that are elastically deformable are used to achieve a close fit between the heat exchange tube preforms 11 and fin grooves 20 of the fin preform 21, so that poor contact between the fin preform 21 and the heat exchange tube preforms 11 is reduced. This ensures that the heat exchange tube preforms 11 and the fin preform 21 are always kept in a close contact state, and increases the welding pass rate of the heat exchanger, thereby not only ensuring heat exchanger welding results, but also simplifying the process, lowering the product rejection rate, reducing the appearance inspection time, and reducing production costs and labor costs.

In addition, the foregoing embodiments of the present invention can be combined to form new embodiments.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A method for producing a heat exchanger which comprises: a plurality of heat exchange tubes, the plurality of heat exchange tubes extending in a first direction and being arranged in a second direction perpendicular to the first direction; and a fin, the fin being provided with a plurality of fin grooves for mounting the plurality of heat exchange tubes respectively, and the fin groove being provided with an opening on one side in a third direction perpendicular to the first direction and the second direction, the method comprising the steps of:

providing heat exchange tube preforms for forming heat exchange tubes, the heat exchange tube preform having a maximum size in the second direction;

providing a fin preform for forming a fin, the fin groove of the fin preform having a minimum size in the second direction, and the maximum size being greater than the minimum size;

inserting the heat exchange tube preforms into the fin grooves of the fin preform, so as to generate a predetermined contact pressure between the heat exchange tube preform and the fin preform by means of an elastic deformation of at least one of the heat exchange tube preform and the fin preform; and welding the heat exchange tube preforms and the fin preform together.

2. The method for producing a heat exchanger as claimed in claim 1, wherein the step of providing heat exchange tube preforms for forming heat exchange tubes comprises:

providing heat exchange tube sheets having a predetermined size; and bending the heat exchange tube sheet to form a heat exchange tube preform in such way that the heat exchange tube preform has a part, the heat exchange tube has a part corresponding to the part of the heat exchange tube preform, and a size of the part of the heat exchange tube preform in the second direction is greater than a size of the part of the heat exchange tube in the second direction.

3. The method for producing a heat exchanger as claimed in claim 2, wherein the step of providing a fin preform for forming a fin comprises:

providing a fin plate having a predetermined size; and forming a fin preform by using the fin plate, wherein the fin preform comprises a fin body, and further comprises: a notch formed in the fin body; and a first flange extending from at least one of two edges of the notch opposite in the second direction toward one side of the fin body in the first direction, such that a fin groove is formed.

4. The method for producing a heat exchanger as claimed in claim 3, wherein in a plane defined by the first direction and the second direction, a distance between the first flange and a center line of the notch extending in the third direction gradually decreases in the first direction from an edge of the first flange connected to the fin body to an edge of the first flange remote from the fin body.

5. The method for producing a heat exchanger as claimed in claim 3, wherein each first flange is an integral first flange; or each first flange comprises a plurality of separate first sub-flanges.

6. The method for producing a heat exchanger as claimed in claim 2, wherein the step of providing a fin preform for forming a fin comprises:

providing a fin plate having a predetermined size; and forming a fin preform by using the fin plate, wherein the fin preform comprises a fin body, and further comprises: a notch formed in the fin body; a first flange extending from at least one of two edges of the notch opposite in the second direction toward one side of the fin body in the first direction; and a second flange inclined, toward the other side of the fin body in the first direction, from an edge of the first flange remote from the fin body toward a middle part of the notch in the second direction, such that a fin groove is formed.

7. The method for producing a heat exchanger as claimed in claim 6, wherein
in a plane defined by the first direction and the second direction, a distance between the second flange and a center line of the notch extending in the third direction gradually decreases in the first direction from an edge of the second flange connected to the first flange to an edge of the second flange remote from the first flange.

8. The method for producing a heat exchanger as claimed in claim 6, wherein
each second flange is an integral second flange; or
each second flange comprises a plurality of separate second sub-flanges.

9. The method for producing a heat exchanger as claimed in claim 2, wherein
the step of providing a fin preform for forming a fin comprises:
providing a fin plate having a predetermined size; and
forming a fin preform by using the fin plate, wherein the fin preform comprises a fin body and further comprises: a notch formed in the fin body; and two first flanges respectively extending from two edges of the notch opposite in the second direction toward the same side or different sides of the fin body in the first direction, such that a fin groove is formed.

10. The method for producing a heat exchanger as claimed in claim 2, wherein
the step of providing a fin preform for forming a fin comprises:
providing a fin plate having a predetermined size; and
forming a fin preform by using the fin plate, wherein the fin preform comprises a fin body, and further comprises: a notch formed in the fin body; two first flanges respectively extending from two edges of the notch opposite in the second direction toward the same side or different sides of the fin body in the first direction; and a second flange inclined, toward the other side of the fin body in the first direction opposite to the side on which at least one of the two first flanges is located, from an edge of the at least one of the two first flanges remote from the fin body toward a middle part of the notch in the second direction, such that a fin groove is formed.

11. The method for producing a heat exchanger as claimed in claim 1, wherein
the heat exchange tube preform comprises a first wall and a second wall opposite in the second direction; and in a plane defined by the second direction and the third direction, the first wall comprises an inclined part inclined relative to the second wall, and the inclined part gradually diverges away from the second wall in the third direction.

12. The method for producing a heat exchanger as claimed in claim 2, wherein
the heat exchange tube sheet comprises two first parts for forming the first wall of a respective heat exchange tube, a second part for forming the second wall of the heat exchange tube, a third part for forming a third wall of the heat exchange tube, and a fourth part for forming a fourth wall of the heat exchange tube, the first wall and the second wall are opposite in the second direction, and the third wall and the fourth wall are opposite in the third direction; and
the step of bending the heat exchange tube sheet to form a heat exchange tube preform comprises:
bending the two first parts toward a middle part of the second part in the third direction respectively along two sides of the rectangular second part of the heat exchange tube sheet opposite in the third direction as bend lines.

13. The method for producing a heat exchanger as claimed in claim 12, wherein the step of bending the heat exchange tube sheets to form a heat exchange tube preform further comprises:
before the step of bending the two first parts toward a middle part of the second part in the third direction respectively along two sides of the rectangular second part of the heat exchange tube sheet opposite in the third direction as bend lines, providing a partition wall and placing the partition wall on the second part, wherein the partition wall is in the shape of a zigzag line, and vertices of the zigzag line-shaped partition wall have heights gradually increasing in the third direction from the two sides of the second part opposite in the third direction toward a middle part of the second part in the third direction.

14. The method for producing a heat exchanger as claimed in claim 11, wherein
the inclined part is in the shape of a flat plate.

15. The method for producing a heat exchanger as claimed in claim 11, wherein
the heat exchange tube preform further comprises: a third wall and a fourth wall opposite in the third direction; and a partition wall for partitioning an inner cavity defined by the first wall, the second wall, the third wall, and the fourth wall into a plurality of channels, the partition wall supporting the inclined part of the first wall in the second direction.

16. The method for producing a heat exchanger as claimed in claim 15, wherein
in the plane defined by the second direction and the third direction, the partition wall is in the shape of a zigzag line, and vertices of the zigzag line-shaped partition wall are in contact with the first wall and the second wall.

17. The method for producing a heat exchanger as claimed in claim 1, wherein
the heat exchange tube preforms comprise a first wall and a second wall opposite in the second direction; and in a plane defined by the second direction and the third direction, the first wall comprises two inclined parts inclined relative to the second wall, and the two inclined parts gradually diverge away from the second wall in the third direction from two edge parts of the heat exchange tube preform opposite in the third direction toward a middle part of the heat exchange tube preform in the third direction.

18. The method for producing a heat exchanger as claimed in claim 1, wherein
the heat exchange tube preform is inserted into the fin groove of the fin preform in the third direction through the opening.

* * * * *